United States Patent Office 3,185,562
Patented May 25, 1965

3,185,562
EMULSIFIABLE PESTICIDAL COMPOSITION
George W. Scoles, Hemlock, and James A. Kelly, Midland, Mich., assignors to The Dow Chemical Company, Midland, Mich., a corporation of Delaware
No Drawing. Filed Apr. 12, 1962, Ser. No. 186,833
5 Claims. (Cl. 71—2.6)

This invention is concerned with pesticides and is particularly directed to novel compositions having improved solubility and dispersibility characteristics.

Pesticides such as insecticides, fungicides and herbicides are presently formulated in a variety of compositions. Thus, for example, liquid compositions comprising esters of halophenoxyaliphatic acids, such as esters of 2,4-dichlorophenoxyacetic acid, 2,4,5-trichlorophenoxyacetic acid, α-(2,4,5-trichlorophenoxy)-propionic acid, 4-chloro-2-methylphenoxyacetic acid, γ-(2,4-dichlorophenoxy)-butyric acid and the like, have found wide application as herbicides in recent years. Similar liquid compositions are in use containing insecticides such as lindane, parathion, methoxychlor and DDT. In such operations, various types of formulations, such as oil-soluble or emulsifiable compositions, have been employed. These compositions have generally been designed for a rather specific end use. Recently, however, particularly among commercial spray operators, it has been discovered that the addition of extra quantities of phytotoxic oils including petroleum distillates results in improved vegetation control and a much more rapid onset of herbicide symptoms. A demand has arisen among such operators for a more versatile formulation than has previously been available, so that there is presently a need for a readily emulsifiable composition which can be diluted with inexpensive petroleum distillates without precipitation of the emulsifying agent.

It is an object of the present invention to provide a novel pesticidal composition. A further object is to provide pesticidal compositions characterized by improved solubility and dispersibility properties as well as improved stability properties. Other objects will become apparent from the following specification and claims.

According to the present invention, it has been discovered that, in pesticidal compositions, desirable properties as regards oil-solubility and water-dispersibility are obtained when such compositions comprise a pesticidal amount of an oil-soluble pesticidal toxicant in solution with an oil-soluble, liquid sodium petroleum sulfonate and with a specified type of polyoxyalkylene monoalkyl ether as hereinafter defined. It is among the advantages of the invention that with a single formulation there is provided a composition (1) capable of being readily dispersed directly in water to form stable emulsions and (2) adapted to be diluted with aliphatic oils to produce homogeneous solutions usable as such and also emulsifiable in water to form stable emulsions without the use of additional emulsifying agents. It has been further found that such compositions are stable upon storage even at low temperatures.

The composition of the polyoxyalkylene monoalkyl ether compounds employed in the compositions of the present invention is critical for obtaining the desired emulsifying power and oil-dilutability properties in the finished composition. The polyoxyalkylene monoalkyl ethers having the required properties are those wherein: (1) the alkyl radical contains from 13 to 18 carbon atoms in straight chain relationship; (2) the oxyalkylene moieties are of the ethylene and propylene series; (3) from 40 percent to 100 percent by weight of the oxyalkylene portion of the ether is composed of oxyethylene moieties; (4) any oxypropylene moieties in the oxyalkylene portion are connected in proximal relation to the alkyl ether linkage; and (5) the oxyalkylene portion constitutes from about 60 to 75 percent by weight of the total ether. Thus, the polyoxyalkylene monoalkyl ethers employed may be represented by the formula $$R\text{—}O\text{—}(C_3H_6O)_m\text{—}(C_2H_4O)_n\text{—}H$$

wherein R is an alkyl radical containing from 13 to 18 carbon atoms in straight chain relationship, m is an integer which may be zero, n is an integer which is never zero and m and n are selected to provide the proportions of oxyalkylene moieties in accordance with the above definition. The polyoxyalkylene monoalkyl ethers may be prepared by known methods, as by the condensation of suitable alkylene oxides with an aliphatic alcohol containing from 13 to 18 carbon atoms with the aid of a catalytic amount of an alkaline catalyst such as an alkali metal hydroxide or an alkali metal alkoxide.

The oil-soluble sodium petroleum sulfonates, as employed in the compositions, are products obtained in the treatment of certain petroleum fractions with concentrated sulfuric acid or oleum and are also known as mahogany soaps or mahogany sulfonates. Generally, such sulfonates are obtained by extraction with aqueous sodium hydroxide from the oil phase separated in the refining of white oil, deodorized kerosene and lubricating oils by treatment with concentrated sulfuric acid or oleum.

Any suitable oil-soluble pesticidal toxicant can be employed in the compositions including insecticides such as lindane, chlordan, methoxychlor, parathion, allethrin, DDT and pyrethrum extracts and herbicides such as substituted phenols, oil-soluble esters of acids such as chloroacetic acid, bromoacetic acid, trichloroacetic acid, dichloropropionic acid and chloroaryloxyaliphatic acids and the like. The present invention has been found to give particularly desirable results with compositions containing, as the pesticidal toxicant, an oil-soluble ester of a chloroaryloxyaliphatic acid and the compositions containing such esters constitute a preferred embodiment of the invention.

The terms "oil-soluble ester of a chloroaryloxyaliphatic acid" and "oil-soluble chloroaryloxyaliphatic acid-ester," as employed in the present specification and claims, refer broadly to the considerable variety of such esters which have been found to be useful for the control of plant growth, provided that a herbicidal amount of said ester is soluble in a petroleum distillate solvent. Representative chloroaryloxyaliphatic acids, which may be esterified with alcohols to provide the aforementioned esters, are 4-chlorophenoxyacetic acid, 2,4-dichlorophenoxyacetic acid, 2,5-dichlorophenoxyacetic acid, 4-chloro-2-methylphenoxyacetic acid, α-(2,4-dichlorophenoxy)-propionic acid, 2,4,5-trichlorophenoxyacetic acid, α-(2,4,5-trichlorophenoxy)-propionic acid, γ-(2,4-dichlorophenoxy)butyric acid and γ-(4-chloro-2-methylphenoxy)-butyric acid. Suitable alcohols to be esterified with the chloroaryloxyaliphatic acids to provide the active esters include: alkanols containing from 1 to 9 carbon atoms, such as methanol, ethanol, 1- and 2-propanol, 2-methyl-1-propanol, 2-methyl-2-propanol, 1- and 2-butanol, 2-methyl-2-butanol, 2-pentanol, 4-methyl-1-hexanol, 4,4-dimethyl-1-hexanol, 3,4-dimethyl-1-hexanol, 4-methyl-heptanol and 1-nonanol, and glycol and polyglycol monoethers including alkoxyethanols, such as methoxyethanol, ethoxyethanol, isopropoxyethanol, butoxyethanols and amyloxyethanols; alkoxypropanols such as methoxypropanols, ethoxypropanols and butoxypropanols; mixed polyglycol ethers such as methoxypropoxyethanol, butoxyethoxypropanol, amyloxyethoxypropoxypropanol and phenoxypropoxyethoxyethanol, and polyglycol ethers, such as phenoxypropoxypropanol, toloxyethoxyethanol, methoxyethoxyethanol, butoxypropoxypropanol, ethoxyethoxyethoxyethanol, butoxyethoxyethoxyethanol and butoxypropoxypropoxypropanol, and the like.

In the preparation of the compositions of the invention, the oil-soluble pesticidal toxicant is blended with the oil-soluble, liquid sodium petroleum sulfonate and the polyoxyalkylene monoalkyl ether with or without an auxiliary organic solvent such as an aliphatic or aromatic hydrocarbon to produce the desired composition as a homogeneous solution. Depending upon the particular toxicant employed, one or more auxiliary organic solvents such as alkanols, aliphatic ketones, chlorinated hydrocarbons and liquid hydrocarbons derived from the distillation of petroleum and coal may be incorporated in the composition. When employing chloroaryloxyaliphatic acid esters of relatively high melting point as the pesticidal toxicant, it is generally desirable and sometimes necessary to employ an aromatic hydrocarbon solvent in the composition to produce the desired homogeneous solution. Alternatively, with such esters of relatively high melting point, the use of a mixture of two or more of the herbicidal esters may serve to produce the desired liquid solution composition.

The oil-soluble, liquid sodium petroleum sulfonate and polyoxyalkylene monoalkyl ether are employed in the proportions of 1 part by weight of the sulfonate to from 1 to 4 parts by weight of said ether. The resulting mixture of emulsifiers is employed in the amount of at least about 4 percent by weight of the composition of the invention. In general, it is desirable to employ the mixture of emulsifiers in the amount of from 5 to 10 percent by weight of the finished composition although higher percentages are sometimes useful.

The amount of pesticidal toxicant to be employed in the compositions will vary depending upon the characteristics of the particular toxicant employed and the particular end use for which the composition is designed. In any case, it is essential that the finished composition contain a pesticidal amount of said toxicant. For most uses, it is desirable to prepare the composition in the form of a concentrate containing from about 25 to 50 percent or more by weight of toxicant. In the preferred compositions containing one or more chloroaryloxyaliphatic esters as toxicants, good results have been obtained when employing from about 25 to 95 percent by weight of the chloroaryloxyaliphatic acid ester and at least about 5 percent of the mixture of emulsifiers with the remainder of the composition, if any, consisting of aromatic or aliphatic hydrocarbon solvent.

The following examples illustrate the invention but are not to be construed as limiting the same.

EXAMPLE 1

Representative polyoxyalkylene monoalkyl ethers were prepared by heating a mixture of 100 parts by weight of a suitable long chain alkanol and about 1.2 parts by weight of sodium hydroxide in a pressure vessel to a temperature of about 125° C. and introducing into such mixture the required molar proportion of alkylene oxide to produce the desired ether product. The reaction mixture is maintained at the reaction temperature until completion of the condensation reaction as shown by a decrease in the pressure in the vessel as the alkylene oxide is consumed. In those products containing both oxypropylene and oxyethylene moieties, a pre-determined amount of propylene oxide is first reacted with the mixture of long chain alkanol and alkali hydroxide and on completion of the reaction of the propylene oxide, the required amount of ethylene oxide is added to the pressure vessel and reacted with the product of the first reaction. Typical products prepared by the above method and suitable for use in the compositions of the invention were as follows:

*Polyglycol Ether No. 1.*—One mole of tridecyl alcohol was reacted with 8 moles of ethylene oxide.

*Polyglycol Ether No. 2.*—One mole of tridecyl alcohol was reacted with 9 moles of ethylene oxide.

*Polyglycol Ether No. 3.*—One mole of tridecyl alcohol was reacted with 5 moles of propylene oxide and the resulting product reacted with 5 moles of ethylene oxide.

*Polyglycol Ether No. 4.*—One mole of cetyl alcohol was reacted with 10 moles of ethylene oxide.

*Polyglycol Ether No. 5.*—One mole of cetyl alcohol was reacted with 15 moles of ethylene oxide.

The above polyglycol ethers were employed in compositions as set forth in subsequent examples.

EXAMPLE 2

The following composition was prepared by blending the ingredients in a mechanical mixer to produce a liquid concentrate composition.

| Ingredient: | Percent by weight |
|---|---|
| Isopropyl ester of 2,4-dichlorophenoxyacetic acid | 37.1 |
| Mixed butyl esters of 2,4-dichlorophenoxyacetic acid | 39.1 |
| Polyglycol Ether No. 1 | 2.5 |
| Carlyle base 136–B | 2.5 |
| Aromatic petroleum solvent | 18.8 |

Carlyle base 136–B is a commercial emulsifying agent identified as an oil-soluble, liquid sodium petroleum sulfonate.

Portions of the above composition were poured into water with moderate agitation and found to produce fine, milky emulsions having a degree of stability suitable for use in commercial spray equipment. Such stable emulsions were prepared with proportions of from 1 quart of the above composition per 5 gallons of water to one quart of said composition per hundred gallons of water.

Further portions of the above composition were diluted with a fuel oil of substantially aliphatic nature in the proportions of one gallon of composition per 1 to 20 gallons of fuel oil. Clear, homogeneous solutions were obtained with no observable separation of emulsifier from the diluted formulation. These formulations which had been diluted with aliphatic oil were readily emulsified when poured into water with moderate agitation to form stable emulsions suitable for commercial use.

EXAMPLE 3

Following the procedure of Example 1, further compositions were prepared as follows.

| Ingredient: | Percent by weight |
|---|---|
| Composition A— | |
| Polypropylene glycol butyl ether esters of 2,4,5-trichlorophenoxyacetic acid | 91.1 |
| Polyglycol Ether No. 1 | 2.47 |
| Oil-soluble sodium petroleum sulfonate | 2.47 |
| Aromatic petroleum solvent | 3.96 |
| Composition B— | |
| Polypropylene glycol butyl ether esters of 2,4,5-trichlorophenoxyacetic acid | 64.4 |
| Polyglycol Ether No. 1 | 2.56 |
| Oil-soluble sodium petroleum sulfonate | 2.56 |
| Aromatic petroleum solvent | 30.48 |
| Composition C— | |
| Polypropylene glycol butyl ether esters of 2,4-dichlorophenoxyacetic acid | 35.1 |
| Polypropylene glycol butyl ether esters of 2,4,5-trichlorophenoxyacetic acid | 32.5 |
| Polyglycol Ether No. 1 | 2.5 |
| Oil-soluble sodium petroleum sulfonate | 2.5 |
| Aromatic petroleum solvent | 27.4 |

Each of the above compositions formed a homogeneous solution. Composition A contains 6 pounds acid equivalent of 2,4,5-trichlorophenoxyacetic acid per gallon of composition. Composition B contains 4 pounds acid equivalent of 2,4,5-trichlorophenoxyacetic acid per gallon of composition. Composition C contains 2 pounds acid equivalent of 2,4-dichlorophenoxyacetic acid and 2 pounds acid equivalent of 2,4,5-trichlorophenoxyacetic acid per gallon of composition.

Each of the above compositions was found to be directly emulsifiable to form stable emulsions in water and to be dilutable with aliphatic oil to produce clear, homogeneous solutions readily emulsifiable in water as in Example 1. The polypropylene glycol butyl ether esters of 2,4-dichlorophenoxyacetic acid and of 2,4,5-trichlorophenoxyacetic acid employed in the above compositions were commercial products containing about 72 percent propylene glycol monobutyl ether ester, 20 percent dipropylene glycol monobutyl ether ester and 8 percent tripropylene glycol monobutyl ether ester.

EXAMPLE 4

Compositions were prepared exactly similar to Composition B of Example 3 except that other of the polyglycol ethers of Example 1 were employed in place of the Polyglycol Ether No. 1 of said Composition B. Each of the resulting compositions was diluted in the proportions of one part by volume of composition to 10 parts by volume of kerosene and the resulting diluted compositions observed for homogeneity and emulsifiability in water. The results are reported in the following table:

| Polyglycol ether employed | Appearance after dilution with kerosene | Emulsifiability |
|---|---|---|
| Polyglycol Ether No. 2 | Clear | Excellent. |
| Polyglycol Ether No. 3 | Very slight haze | Good. |
| Polyglycol Ether No. 4 | Clear | Excellent. |
| Polyglycol Ether No. 5 | do | Do. |

EXAMPLE 5

The following composition is prepared by blending the ingredients at a temperature of about 45° C. and thereafter cooling to room temperature.

| Ingredient: | Percent by weight |
|---|---|
| Chlordan | 25 |
| Liquid sodium petroleum sulfonate | 2 |
| Polyglycol cetyl ether | 8 |
| Aromatic petroleum solvent | 65 |

The polyglycol cetyl ether, employed above, is prepared by heating one molar proportion of cetyl alcohol to a temperature of 60° C. in a pressure vessel and adding thereto portionwise with stirring 0.06 molar proportion of metallic sodium to produce sodium cetoxide catalyst in situ. Thereafter the mixture is heated to 125° C. and 2 molar proportions of propylene oxide added under autogenous pressure. On completion of the reaction of the alcohol with the propylene oxide, 10 molar proportions of ethylene oxide is added to the reaction mixture and heating at about 125° C. continued to complete the reaction and produce the desired polyglycol cetyl ether.

The above composition is directly emulsifiable in water and also dilutable with kerosene to prepare homogeneous oil spray compositions.

Other suitable polyoxyalkylene monoalkyl ethers for use in the compositions of the invention may be prepared by reacting one molar proportion of tetradecyl alcohol with 10 molar proportions of ethylene oxide or one molar proportion of octadecyl alcohol with 10 molar proportions of ethylene oxide.

EXAMPLE 6

In an additional operation, the following compositions were prepared following the procedure in Example 1.

| Ingredient: | Percent by weight |
|---|---|
| Polypropyleneglycol butyl ether ester of 2,4,5-trichlorophenoxyacetic acid | 64.4 |
| Aromatic petroleum solvent | 30.48 |
| Carlyle base 136-B | 2.56 |
| Polyglycol ether | 2.56 |

The polyglycol ethers employed in the several compositions were as follows:

Composition D—Polyglycol Ether No. 2

Composition E—Polyglycol Ether No. 4

Composition F—Polyglycol Ether No. 5

Portions of each of Compositions D-F are diluted with a fuel oil of substantially aliphatic nature in the proportions of 1 part by volume of composition per 10 parts by volume of fuel oil. The resulting solutions were observed for homogeneity and to determine whether any separation of emulsifier occurred from said solution. The observation showed the diluted compositions to be clear, homogeneous solutions. It was further found that the diluted compositions remained homogeneous, clear solutions upon prolonged storage.

The polypropyleneglycol butyl ether ester of 2,4,5-trichlorophenoxyacetic acid employed in the above-described operations was a mixture obtained as a commercial product and containing about 72 percent propyleneglycol monobutyl ether ester, 20 percent dipropyleneglycol monbutyl ether ester and 8 percent tripropyleneglycol monobutyl ether ester.

This application is a continuation-in-part of our copending application Serial No. 719,210, filed March 5, 1958, now abandoned.

What is claimed is:

1. A pesticidal composition which comprises a pesticidal amount of an oil-soluble pesticidal toxicant in solution with an oil-soluble, liquid sodium petroleum sulfonate and a polyoxyalkylene monoalkyl ether wherein (1) the alkyl contains from 13 to 18 carbon atoms in straight chain relationship, (2) the oxyalkylene moieties in the polyoxyalkylene portions of the ether are selected from the group of series consisting of the ethylene and propylene series, (3) from 40 percent to 100 percent by weight of said portion is composed of oxyethylene moieties, (4) any oxypropylene moieties in said polyoxyalkylene portion are connected in proximal relation to the alkyl ether linkage, and (5) said oxyalkylene portion constitutes from about 60 to 75 percent by weight of the ether, said petroleum sulfonate and polyoxyalkylene monoalkyl ether being employed in the proportions of 1 part by weight of sulfonate to from 1 to 4 parts by weight of polyoxyalkylene ether and said sulfonate and ether together constituting at least 4 percent by weight of the total composition.

2. A herbicidal composition which comprises a herbicidal amount of an oil-soluble ester of a chloroaryloxy-aliphatic acid in solution with an oil-soluble, liquid sodium petroleum sulfonate and a polyoxyalkylene monoalkyl ether wherein (1) the alkyl contains from 13 to 18 carbon atoms in straight chain relationship, (2) the oxyalkylene moieties in the polyoxyalkylene portion of the ether are selected from the group of series consisting of the etheylene and propylene series, (3) from 40 percent to 100 percent by weight of said portion is composed of oxyethylene moieties, (4) any oxypropylene moieties in said polyoxyalkylene portion are connected in proximal relation to the alkyl ether linkage, and (5) said oxyalkylene portion constitutes from about 60 to 75 percent by weight of the ether, said petroleum sulfonate and polyoxyalkyene monoalkyl ether being employed in the proportions of 1 part by weight of sulfonate to from 1 to 4 parts by weight of polyoxyalkylene ether and said sulfonate and ether together constiuting at least 4 percent by weight of the total composition.

3. A composition in accordance with claim 2 wherein the ester is the monopropylene glycol butyl ether ester of 2,4,5-trichlorophenoxyacetic acid.

4. A composition according to claim 2 wherein the polyoxyalkylene monoalkyl ether is the condensation product from one molar proportion of tridecyl alcohol with nine molar proportions of ethylene oxide.

5. A composition in accordance with claim 2 wherein the polyoxyalkylene monoalkyl ether is the condensation product from one molar proportion of cetyl alochol with from 10 to 15 molar proportions of ethylene oxide.

References Cited in the file of this patent

UNITED STATES PATENTS 2,898,267    Lindner _____ Aug. 4, 1959
2,913,372    Velde et al. _____ Nov. 17, 1959

OTHER REFERENCES

Metcalf: Advances in Pest Control Research, vol. 1, copyright 1957, pages 42–43.